United States Patent
McCarthy et al.

(10) Patent No.: US 10,911,815 B1
(45) Date of Patent: *Feb. 2, 2021

(54) PERSONALIZED RECAP CLIPS

(71) Applicant: Amazon Technologies, Inc., Seattle, WA (US)

(72) Inventors: Shaun Patrick McCarthy, Seattle, WA (US); Yaron Sole, Seattle, WA (US); Trevor James Walker, Seattle, WA (US); Arun Velayudhan Pillai, Sammamish, WA (US); Venkatraman Prabhu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,937

(22) Filed: Jan. 9, 2020

Related U.S. Application Data

(63) Continuation of application No. 15/714,884, filed on Sep. 25, 2017, now Pat. No. 10,555,023.

(51) Int. Cl.
| | |
|---|---|
| *H04N 9/80* | (2006.01) |
| *H04N 21/2668* | (2011.01) |
| *H04N 21/258* | (2011.01) |
| *H04N 21/8549* | (2011.01) |
| *G11B 27/031* | (2006.01) |
| *H04N 21/84* | (2011.01) |
| *H04N 5/93* | (2006.01) |
| *G11B 27/00* | (2006.01) |

(52) U.S. Cl.
CPC ....... *H04N 21/2668* (2013.01); *G11B 27/031* (2013.01); *H04N 21/25891* (2013.01); *H04N 21/84* (2013.01); *H04N 21/8549* (2013.01)

(58) Field of Classification Search
USPC .................................................. 386/248, 278
See application file for complete search history.

(56) References Cited

U.S. PATENT DOCUMENTS

| | | |
|---|---|---|
| 8,094,872 B1 | 1/2012 | Yagnik et al. |
| 8,544,167 B2 | 10/2013 | Morita |
| 8,731,373 B2 | 5/2014 | Gerbasi |
| 9,015,736 B2 * | 4/2015 | Cordray ............... H04N 21/431 725/10 |
| 9,077,956 B1 | 7/2015 | Morgan et al. |
| 9,253,533 B1 | 2/2016 | Morgan et al. |
| 9,398,350 B1 | 7/2016 | Ong et al. |
| 9,813,784 B1 | 11/2017 | Carlson et al. |
| 10,469,918 B1 | 11/2019 | Carlson et al. |
| 2007/0157248 A1 | 7/2007 | Ellis |
| 2012/0072959 A1 | 3/2012 | Bhagavath et al. |
| 2012/0117017 A1* | 5/2012 | Phillips ............ H04N 21/44204 706/50 |
| 2012/0311640 A1 | 12/2012 | Cahnbley et al. |
| 2014/0245151 A1 | 8/2014 | Carter et al. |
| 2014/0267931 A1 | 9/2014 | Gilson et al. |

(Continued)

OTHER PUBLICATIONS

U.S. Appl. No. 15/714,884, filed Sep. 25, 2017, McCarthy et al.

(Continued)

*Primary Examiner* — Nigar Chowdhury
(74) *Attorney, Agent, or Firm* — Weaver Austin Villeneuve & Sampson LLP

(57) ABSTRACT

Techniques are described that enable personalized recap clip sequences.

20 Claims, 4 Drawing Sheets

(56) References Cited

U.S. PATENT DOCUMENTS

| | | | |
|---|---|---|---|
| 2014/0270700 A1 | 9/2014 | Dhanasamsombat et al. | |
| 2015/0121214 A1* | 4/2015 | Roberts | G06Q 30/0255 |
| | | | 715/705 |
| 2015/0229975 A1 | 8/2015 | Shaw et al. | |
| 2015/0382069 A1 | 12/2015 | Pearlman et al. | |
| 2016/0105733 A1 | 4/2016 | Packard et al. | |
| 2016/0117940 A1* | 4/2016 | Gomory | G09B 17/003 |
| | | | 434/262 |
| 2016/0142761 A1* | 5/2016 | Govinde | H04N 21/4334 |
| | | | 386/296 |
| 2016/0173941 A1 | 6/2016 | Gilson et al. | |
| 2016/0300433 A1 | 10/2016 | Ortiz et al. | |
| 2016/0371257 A1* | 12/2016 | Nishimura | G06F 16/40 |

OTHER PUBLICATIONS

U.S. Office Action dated May 11, 2016 issued in U.S. Appl. No. 14/668,738.

U.S. Final Office Action dated Aug. 4, 2016 issued in U.S. Appl. No. 14/668,738.

U.S. Office Action dated Dec. 22, 2016 issued in U.S. Appl. No. 14/668,738.

U.S. Office Action dated May 5, 2017 issued in U.S. Appl. No. 14/668,738.

U.S. Notice of Allowance dated Aug. 10, 2017 issued in U.S. Appl. No. 14/668,738.

U.S. Office Action dated Sep. 12, 2018 issued in U.S. Appl. No. 15/711,285.

U.S. Final Office Action dated Mar. 11, 2019 issued in U.S. Appl. No. 15/711,285.

U.S. Notice of Allowance dated Aug. 27, 2019 issued in U.S. Appl. No. 15/711,285.

U.S. Office Action dated May 30, 2019 issued in U.S. Appl. No. 15/714,884.

U.S. Notice of Allowance dated Sep. 25, 2019 issued in U.S. Appl. No. 15/714,884.

* cited by examiner

PERSONALIZED RECAP CLIPS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

Some media content, such as episodes of television shows, often include a recap segment at the beginning of each episode that includes a series of clips recapping previous episodes. Unfortunately, the content in a conventional recap segment may provide too much or too little detail on a past episode relative to a particular playback history.

DETAILED DESCRIPTION

This disclosure describes techniques for personalizing a sequence of recap clips associated with episodes of media content. Recap sequences may be personalized based on a variety of factors including, for example, playback history, viewer preferences, device attributes, and the content of a requested episode. Playback history can include which episodes were previously played, when the episodes were played, and what portions of the episodes were played. Viewer preferences can be explicit, such as a genre preference in a user profile, or can be inferred, such as from playback history of similar media content. Device attributes can include audio/video rendering capabilities of a device requesting media content, display size, and other hardware characteristics. Recap sequences can also be personalized relative to the requested episode, such as selecting recap clips that relate to a story arc that is developed in the requested episode.

The personalized recap clip sequence, or "previously on" segment, is played prior to media content, or in a portion of a display for media content selection. The personalization of the recap helps with overcoming the inertia associated with re-engagement, which is caused by viewers not wanting to restart from the beginning of the show, and also not wanting to start from the middle because of the possibility of confusion due to a forgotten story arc. For viewers who are not necessarily trying to catch up or re-engage, the personalized recap sequences can also be used for a "Skip to episode X" or "View summary of episode Y" feature that aggregates important scenes of an episode into a briefer summary episode.

Figure 1:
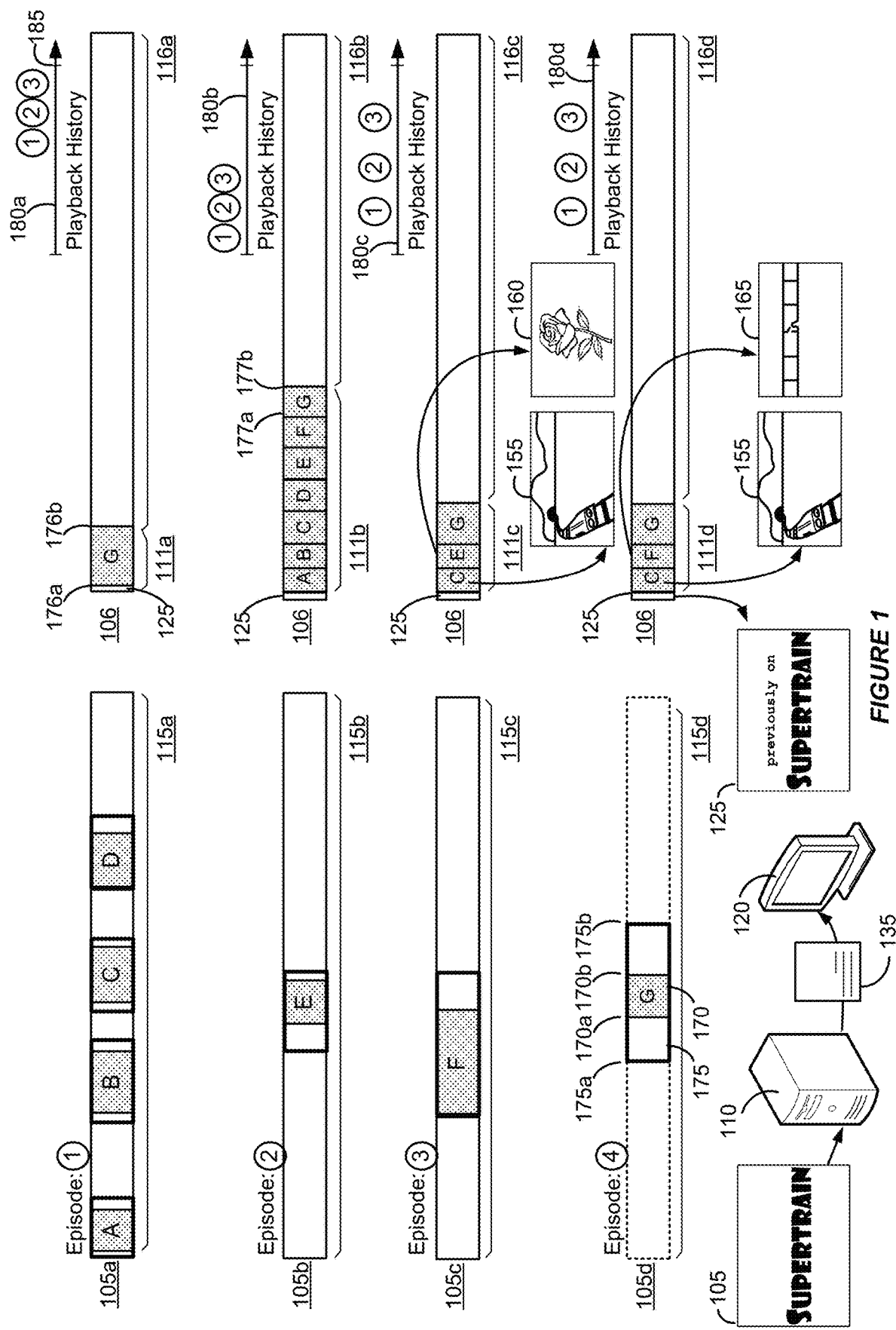
FIG. 1 illustrates an example of providing personalized recap clip sequences.

FIG. 1 illustrates an example of providing personalized recaps. The example in FIG. 1 can be used to provide a personalized recap of a collection of episodes to help users catch up on skipped episodes or episodes watched a long time ago, or to help users who have abandoned the show reengage with the show. In FIG. 1, episode 105a is a first episode of a show (e.g., episode 1 of season 3), episode 105b is a second episode, episode 105c is a third episode, and episode 105d is a fourth episode. Each episode in episodes 105a-d can be from different seasons, and may not necessarily be successive episodes. Each episode in episodes 105a-d has corresponding episode content 115a-d. The episodes in episodes 105a-d may also have corresponding non-episode content (not shown in FIG. 1), such as, for example, interspersed advertisements and/or generic recap sequences preceding each episode in episode content 115a-d.

In FIG. 1, recap clips A-G are illustrated by the time intervals of episode content 115a-d represented by rectangles with dotted fill patterns and having labels A-G. In FIG. 1, the rectangle with a dotted fill pattern containing the label G represents recap clip G, a portion of episode content 115d corresponding to episode 105d, the fourth episode. In some implementations, information to represent a recap clip might include, for example, an episode identifier, a starting timecode, and an ending timecode. In FIG. 1, recap clip G has an episode identifier corresponding to episode 105d, a starting timecode 170a, and an ending timecode 170b. It should be noted that the size of the rectangles representing recap clips are illustrated for clarity purposes, and are not intended to represent absolute or relative recap clip time durations. It should be further appreciated that distinct recap clips may correspond to timecodes that overlap, such as a first recap clip starting at 5 seconds and ending at 10 seconds, and a second recap clip starting at 8 seconds and ending at 13 seconds. Similarly, a recap clip that corresponds to timecodes that are nested within another recap clip may still be a distinct recap clip, such as a first recap clip starting at 5 seconds and ending at 15 seconds, and a second recap clip starting at 8 seconds and ending at 13 seconds.

In the example illustrated in FIG. 1, episodes 105a-c have previously been viewed by viewer device 120. Episode 105d has not been viewed by viewer device 120. In FIG. 1, media server 110 receives request 185 from viewer device 120 for media content 105, which corresponds to the SUPERTRAIN show corresponding to episodes 105a-d. For the techniques disclosed herein, the request may correspond to an episode, scene, or any portion of media content 105. For example, the request may correspond to one of the previously watched episodes in episodes 105a-c, or the unwatched episode 105d, or a different unwatched episode. Furthermore, a previously watched episode in episodes 105a-c may not have been watched in its entirety, and the request may correspond to a scene in which the episode was paused.

In response to receiving request 185 for media content 105 from viewer device 120, media server 110 retrieves a playback history associated with both the media content 105 and viewer device 120. Requested episode 106 and playback history 180a-d represent four scenarios for playback history that include playback information for episodes 105a-d. Playback history 116a represents playback of episodes 105a-c in quick succession shortly before request 185 for media content 105, as illustrated by the circles numbered 1, 2, and 3 clustered to the rightmost side of the timeline. The absence of a circle numbered 4 in playback history 116a represents that episode 105d has not been viewed by viewer device 120 providing request 185. Playback history 180b-d are interpreted in a similar manner. For example, playback history 180b represents playback of episodes 105a-c in quick succession several months before request 185. As another example, playback histories 180c and 180d represent identical playback histories, where playback of episodes 105a-c are distributed over the course of several months, the last one being played a few months before request 185.

Based on a playback history, media server 110 selects a subset of the recap clips A-G. For example, for playback history 180a, recap clips A-F are not selected because they correspond to portions of episodes that have been watched recently with respect to the timing of request 185. Viewer device 120 having playback history 180a does not need to experience the delay associated with watching recap clips that are unnecessary. However, because playback history 180a indicates episode 105d was skipped, the media server includes recap clip G in the selected recap clips.

As another example, for playback history 180b, recap clips A-G are selected because they correspond to portions of episodes that have been watched a long time ago relative to the timing of request 185, or have not been watched at all, such as episode 105d.

As a further example, for playback history 180c, recap clips C, E, and G are selected because they also correspond to portions of episodes that have been watched a long time ago, or have not been watched at all. As a further example, for playback history 180d, recap clips C, D, and G are selected for similar reasons.

In FIG. 1, playback history 180c and playback history 180d are identical, but the selected recap clips are different because, in this example, media server 110 can select recap clips based on personalized information in addition to personalized playback history. For example, the viewer device associated with playback history 180c has indicated using a media content category selection in a user profile that media content corresponding to romance is of particular interest. Therefore, recap clip E, which represents romantic scene 160 with flowers, is included for selection. In contrast, for the viewer device associated with playback history 180d, recap clip D, which represents action scene 165 with broken railroad tracks, is included in the recap clip selection instead of romantic scene 160. For playback history 180d, there may not be a media content category selection in a user profile available to media server 110. However, media server 110 can refer to playback history 180d, which in some implementations, may include playback history for other media content. For example, playback history 180d may indicate that several episodic television shows that are action oriented have been watched, whereas very few television shows that are romance oriented have been watched. Therefore media server 110 infers that for playback history 180d, selecting the recap clip D corresponding to action scene 165 may be more likely to match the preferences of the user associated with the viewer device issuing request 185.

Recap clip selection can additionally use information on the portion of the media content being requested by request 185. For example, request 185 may correspond to an episode of media content 105 having metadata describing particular scenes. Such metadata may include actor profiles, critical commentary, user feedback, narrative descriptions, trivia, importance scores, association factor with a particular plot arc, and other information related to portions of media content, such as a scene within an episode. As one example, videos available through Amazon Prime Video include an X-ray feature including certain types of such information. Using such metadata, media server 110 can determine a relationship between previously watched episodes and the episode being requested. For example, by detecting from the metadata for the episode being requested that a particular plot arc is going to be resolved in the episode being requested, media server 110 can select recap clips that serve to both refresh the memory of the viewer in regards to the plot arc, and motivate the viewer to reengage with the media content to learn the resolution of the plot arc. For instance, in FIG. 1, media server 110 can determine that the requested episode corresponding to request 185 involves a plot arc with a train traversing a deep mountain tunnel. For playback history 180c and playback history 180d, media server 110 selects establishing scene 155, which provides a depiction of a train entering the mountain tunnel, thereby providing a reminder of particular plot arc.

In addition to selecting recap clips, media server 110 can also modify recap clips. Modification of recap clips can be based on similar factors as described herein for selecting recap clips. For example, for playback history 180a-b, recap clip G with starting timecode 170a and stopping timecode 170b corresponding to a 30 second duration is selected. Playback history 180a, which indicates watching episodes 105a-c recently and in rapid succession, but skipping episode 105d, the start time 176a and stop time 176b for recap clip G for recap sequence 111a may correspond to a 30 second duration. Since there are no other recap clips, a long duration for recap clip G is used provide a summary of skipped episode 105d.

In contrast, playback history 180b, which indicates watching episodes 105a-c a long time ago, the start time 177a and stop time 177b for recap clip G for the recap sequence 111b may correspond to a 5 second duration. This allows sufficient time in recap sequence 111b for recap clips A-F corresponding to episodes 105a-c, without having the entire recap sequence 111b be too long.

In other words, the modification of the recap clip G can be influenced by, for example, the other recap clips included in the recap sequence. Because of the numerous recap clips selected for playback history 180b that help to summarize the media content 105, an abridged 5 second version of the unmodified 30 second version of recap clip G is used for recap sequence 111b.

In some implementations, a recap clip can be modified based on viewer preferences. For example, for the viewer device corresponding to playback history 180c, which corresponded to selection of romantic scene 160, recap clip C containing portions oriented to both romance and action can be modified to emphasize the romance aspect, such as the dialogue between two characters riding a train. Similarly, a recap clip for the viewer device corresponding to playback history 180d, which corresponded to selection of action scene 165, may be modified to emphasize the action aspect of recap clip C, such as thugs preparing to hijack the train.

In some implementations, recap clips can also be selected or modified based on attributes of the viewer device providing request 185. For example, when the number of recap clips is constrained, recap clip selection may prioritize certain recap clips over others. For instance, for a viewer device corresponding to a large high definition television, sweeping shots of elaborate scenery can be prioritized to emphasize the cinematography of media content 105. In contrast, for a viewer device such as a mobile device with a small screen, recap clip selection may prioritize recap clips having witty dialogue or memorable one-liners, thereby relying on character development to drive interest in media content 105, and deemphasizing limitations associated with the more basic audio/visual hardware set up.

In various implementations, image frames within recap clips can also be modified based on attributes of the viewer device providing request 185. Returning to the example of a viewer device corresponding to a small screen size, the recap clips can be cropped and zoomed to emphasize visually interesting portions of an image frame. For instance, static scenery surrounding a train moving at high speed can be cropped out to make the speeding train easier to view in a small screen.

In some implementations, recap clips are re-ordered relative to their order of appearance in media content 105. For example, for the recap clips A-G provided in response to request 185 corresponding to playback history 180*b*, the recap clips may be ordered such that a particular plot arc is displayed as successive recap clips, in contrast to ordering based on the order of appearance in media content 105. For instance, recap clips may be ordered A, C, E, and G which represent one plot arc, followed by B, D, and F which represent a second plot arc. This results in certain recap clips being out of order relative to playback of media content 105, such as recap clips C, E, and G being ordered before recap clip B. It should be appreciated that reordering can be part of the selection of recap clips, part of the modification of recap clips, or can occur separately from selection and modification of recap clips.

In some implementations, modification of recap clips is not limited to adjusting start and stop times of video tracks and audio tracks associated with a recap clip. Media content composition processes can be applied. For example, background music can be mixed in with existing audio tracks, personalized overlays such as text messages can be added, or effects such as slow-motion can be used. Such incorporation of new media content or media content effects may increase the dramatic feel of the recap sequence, and thereby further motivate a user of the viewer device to watch the corresponding media content.

In FIG. 1, the information for requesting the recap clip sequence 111*a-d*, which each correspond to a particular selection of recap clips, which may also have been modified, reordered, and combined with new media content or media content effects, are provided to the viewer device issuing request 185 for media content 105. In some implementations, the information may be in the form of recap manifest data 135 representing network locations of fragments of the recap clip sequence, such as using Uniform Resource Locators (URLs). In certain implementations, recap manifest data 135 can provide a list of network addresses. In other implementations, recap manifest data 135 can specify a template for formatting requests for media content fragments. Viewer device 120 uses recap manifest data 135 to generate requests for media content fragments corresponding to the customized recap sequence. Media server 110, or a server in a content delivery network, provides the fragments corresponding to the recap sequence to viewer device 120. In certain implementations, the media server can also provide fragments corresponding to segment 125 that when displayed by a viewer device, indicates that a sequence of recap clips providing a "previously on" segment for the media content 105 are about to be played back.

It should be appreciated that different implementations of the techniques disclosed herein may use different levels of resolution for personalization of recap clip sequences. For example, certain implementations may generate an individual recap clip sequence for each viewer device. In other implementations, viewer devices can be categorized into groups, with each group corresponding to a particular sequence of recap clips. Each particular sequence of recap clips may be generated in response to each request from a viewer device within the corresponding group, or may be pre-generated and provided in response to each request from a viewer device within the corresponding group. For example, for three groups corresponding to abandoning the show more than one year ago, between one year and three months ago, and between three months and one month ago, each group can be mapped to a different pre-generated sequence of recap clips.

It should be appreciated that personalization resolution can be scaled along dimensions other than or in addition to playback history. For example, the three groups corresponding to playback history can be further partitioned based on demographics (e.g., age range, gender, etc.), with each subgroup having a respective sequence of recap clips. As another example, viewer devices can be grouped based on viewer profiles (e.g., fans of shows with strong male leads, comedy fans, fans of a particular actor, etc.), such that, for example, the comedy fans are provided a sequence of recap clips that emphasize the comedy aspects of a show. The level of personalization may also be influenced by factors such as, for example, the level of detail provided by playback history (e.g., a single timestamp of the last portion played versus playback timestamp of every scene in every episode watched), the level of detail provided by user profile data associated with a viewer device, storage space, and whether recap clips are pre-generated or dynamically generated.

Figure 2:
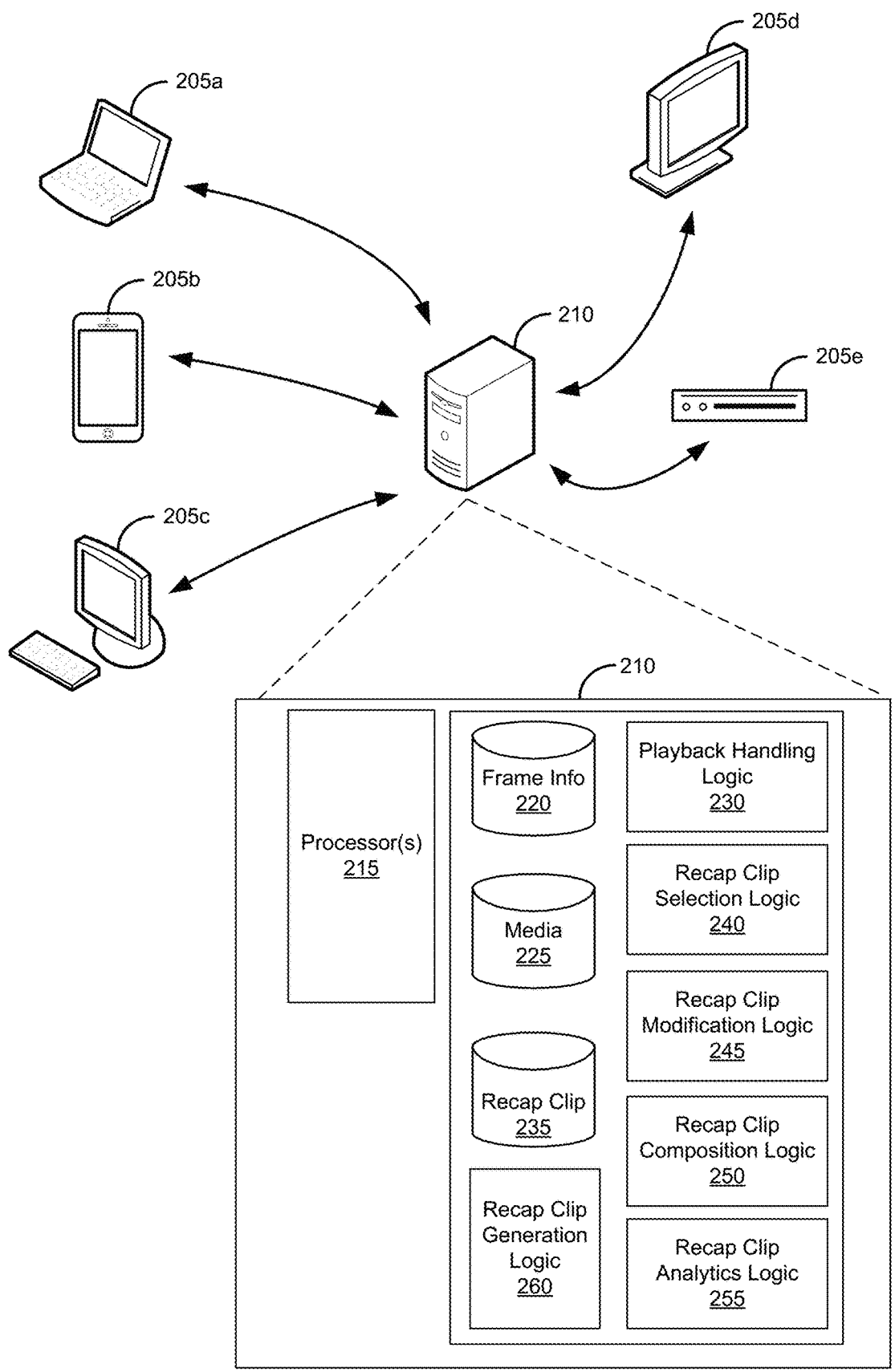
FIG. 2 illustrates an example of a computing environment for providing personalized recap clip sequences.

FIG. 2 illustrates an example of a computing environment for a server used to provide a personalized sequence of recap clips. The computing environment of FIG. 2 includes media server 210 which can be used to provide media content for playback on devices 205*a-e*.

It should also be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 210 may be part of a content delivery system that conforms to any of a wide variety of architectures. The functionality and components of media server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

Media server 210 can include various types of logic used to provide media content for playback at devices 205*a-e*. In FIG. 2, media server 210 includes media content storage 225, frame information 220, and recap clip information 235.

Media server 210 also includes playback handling logic 230, recap clip selection logic 240, recap clip modification logic 245, recap clip composition logic 250, recap clip analytics logic 255, and recap clip generation logic 260.

Media content storage 225 stores a variety of media content for playback on devices 205a-e, such as episodes of television shows, movies, music, etc. Recap clip information 235 can be a storage mechanism, such as a database, storing metadata relating to recap clips corresponding to subsets of frames (i.e., still images in video) of television shows. For example, recap clips of every episode of a television show stored in media content storage 225 can be represented by an episode identifier, start time, and end time that are stored in recap clip information 235. In some implementations, each recap clip in recap clip information 235 may be associated with additional information, such as, for example, an importance ranking, relationship to other recap clips, relationship to a corresponding scene, a category (e.g., action, romance, etc.), a setting, included actors, closed-captioned data providing a transcript of the dialogue in the recap clip, script data providing production details, a plot arc identifier, user rankings or commentary, trivia, and so forth.

Recap clip generation logic 260 performs tasks related to generating the contents of recap clip information 235. In some implementations, at least some of the contents of recap clip information 235 may be generated manually by the producer of media content 105. Alternatively, the contents of recap clip information 235 may be generated manually by the viewers of media content 105. For example, viewers can interact with each episode during the course of watching media content 105 to generate metadata such as bookmarks, commentary, genre tags, content tags (e.g., strong male lead, etc.), importance scores, plot arc identifier, ratings, and so forth. Recap clip information 235 can be generated by non-viewers, such as a vendor like Movieclips that provides a gallery of clips at the movieclips.com website, or by fans using, for example, a crowdsourcing infrastructure such as Amazon's Mechanical Turk. Both viewer and non-viewer techniques for generating recap clip information 235 can be integrated with gamification features, such as, for example, rewarding users who identify recap clips associated with a high probability of viewers who finish watching media content 105.

In certain implementations, at least some of the contents of recap clip information 235 may be generated automatically. For example, image processing of video frames to identify changes in scenery and/or characters depicted, audio processing to detect changes in music, ambient audio, and dialogue, and natural language processing of textual data in the script or available subtitles to perform content and sentiment analysis, may each contribute to both delimiting portions of media content 105 and associating metadata with the delimited portion. For example, an episode of media content 105 may correspond to a sequence of scenes. In some implementations, each scene may be automatically delimited based on detecting scenery changes. In various implementations, the scene can be further separated into multiple clips based on semantic analysis of dialogue, and each clip can be stored in recap clip information 235 with an episode identifier, start time, and end time. It should be appreciated that generation of the contents of recap clip information 235 may involve a hybrid of manual and automated approaches.

It should be appreciated that the techniques for generating personalized recap clip sequences as described herein are compatible with a wide variety of time frames for the generation of recap clip information 235. For example, for a television show having multiple seasons and episodes, personalized recap clip sequences can use recap clip information 235 that may have been generated months in advance, such as at the time of production of the television show episode. As another example, for a live sporting event, personalized recap clip sequences can use recap clip information 235 that may have been generated in near real-time, such as a highlight reel of a spectacular football touchdown occurring less than a minute ago.

Media server 210 also can include one or more processors 215, memory, and other hardware for performing the tasks disclosed herein. For example, playback handling logic 230 determines whether a request for media content 105 has been received from a viewer device, identifies the media content being requested, and retrieves playback history associated with the viewer device. Playback handling logic 230 also performs tasks relating to generating and providing manifest data representing recap clip sequences.

Recap clip selection logic 240 performs tasks relating to selecting certain recap clips from recap clip information 235 based on playback history, viewer preferences, requested content, and device attributes. Recap clip modification logic 245 performs tasks relating to modifying the selected recap clips based on similar factors as for recap clip selection. In some implementations, recap clip selection logic 240 or recap clip modification logic 245 may perform tasks relating to reordering recap clips.

In some implementations, recap clip information 235, which stores metadata relating to recap clips, can also be used to store representations of sequences of selected, modified, and reordered recap clips that are personalized to a particular viewer device. For example, each recap sequence as represented by recap sequences 111a-d may be stored as a data structure including fields corresponding to recap clip identifiers, order of appearance, starting and stop time modifiers, and viewer device identifier.

Recap clip selection logic 240 and/or recap clip modification logic 245 can interface to recap clip analytics logic 255. Recap clip analytics logic 255 performs tasks related to statistical analysis of recap clip selection and modification. For example, in certain implementations, the selection, modification, and reordering of recap clips may be based on the relationship between the current playback history of viewer device 120 and a change in playback history for other viewer devices. For instance, returning to FIG. 1, in responding to request 185 from viewer device 120 having a playback history 180b, which corresponds to watching episodes 105a-c several months before request 185, media server 110 can lookup information relating to recap clip sequences previously generated for other viewer devices. For the lookup, media server 110 can specify media content 105 and playback history 180b, and may also specify the episode corresponding to request 185, and the attributes of viewer device 120. The lookup process can return a set of recap clip sequences that were previously generated for a similar configuration of media content, playback history, episode requested, and device attributes. The sequences in the set may vary based on recap clip selection, modification, and/or ordering. Each sequence in the set may also have an associated field indicating whether the viewer device for which the sequence was generated eventually watched all episodes of the media content 105. Alternatively, media server 110 can retrieve the current playback history for viewer devices corresponding to the set of sequences to determine whether media content 105 was eventually watched in its entirety.

The recap clip sequence 111b to be used for responding to request 185 from viewer device 120 with playback history 180b can be based on the sequence in the set of sequences associated with the highest probability of a viewer device eventually watching all episodes of the media content 105. It should be appreciated that other probability values can be used for sequence selection. For example, a sequence can be selected based on having the highest probability of viewer devices completing the requested episode, or completing the season with the requested episode. As another example, in implementations where an option to skip a provided personalized recap clip sequence is available to the viewer device, a sequence can be selected based on having the lowest probability of viewer devices activating the skip option. Selection of the option to skip personalized recap sequences may be tracked for the purpose of adapting the approach taken in generating recap sequences for particular users over time. Selection of the skip option may also be provided as input to analytics logic 255 to support decision making over a population of users.

In some implementations, such statistical analysis of different recap clip sequences are used as inputs to a machine learning algorithm, such as, for example, neural networks, for modifying the criteria for selection, modification, and ordering of recap clips to maximize a particular objective, such as completion of the entire media content 105.

It should be appreciated that different implementations of the techniques disclosed herein may use different levels of resolution for the data set for statistical analysis of recap clip sequences. For example, certain implementations may uniquely map a recap clip sequence to one viewer device. Some implementations may use a more coarse resolution, such as, for example, playback history indicating that the same episode was played within a time difference of a month may be mapped to the same recap clip sequence.

In one example, viewer device 120 is determined (e.g., using social networking information) to have a relationship to another viewer device, such as, for example, being classmates. Based on the playback history for both viewer devices, media server 110 can determine viewer device 120 has stopped watching media content 105, but that the classmate has continued watching. Media server 110 can provide viewer device 120 with a "Quickly catch up with friend X" option. When viewer device 120 activates the option, media server 110 provides for playback the most recent episode that the classmate has watched, and skipping the earlier episodes not watched by viewer device 120. Media server 110 can then select a set of recap clips that prioritize providing context for the specific episode being provided, and also emphasize recap clips for the skipped episodes as opposed to the previously watched episodes. This feature allows one viewer device to quickly catch up with the playback history of another viewer device.

It should be appreciated that personalized recap clip sequences to allow one viewer to catch up with another viewer can also be provided in the context of different user profiles that share an account and/or a viewer device. For example, for a subscription service to a media content service (e.g., Netflix, HBO Go, etc.) that allows multiple family members to share a single login, a parent may have fallen behind on a television show that the family enjoys watching together. A "Quickly catch up with your kids" option can allow the parents to view a personalized recap clip sequence that helps the parents catch up to the episode last watched by their kids. It should further be appreciated that each parent may have fallen behind by a different amount, and therefore each parent can have their own personalized recap clip sequence.

Recap clip composition logic 250 performs tasks relating to incorporation of new media content or media content effects. For example, an application programming interface for video editing software can provide rendering interfaces corresponding to a media content layer and a dynamic layer. In some implementations, the media content layer corresponds to previously generated media content, such as the recap clip sequence representing media content 105 as selected and modified by recap clip selection logic 240 and recap clip modification logic 245. In certain implementations, the dynamic layer can correspond to markup content and associated data, such as markup files using HTML, CSS, and XML, along with corresponding fonts, audio, and image files that are referenced by the markup files. A render input provides customized information specifying the parameters for composing personalized media content using the media content layer and dynamic layer. For example, the media content layer can correspond to recap clips for a show that a viewer device has abandoned. The dynamic layer can correspond to a template, such as a "Reengage abandoned viewer for show X" template, that provides a layout, font, font size, color scheme, and background image that is standardized for reaching out to a viewer who is determined based on playback history to have abandoned show X. A render input instruction, such as a list of fields represented by a JSON object, can provide customized information such as the viewer's name and the name of the show. The media content layer, dynamic layer, and render input instruction can be used to generate a personalized recap clip sequence with a personalized overlay, such as a text box displaying "Jeff, time to catchup on House of Cards." The media content layer can incorporate additional media content, such as a popular song, or bonus footage related to media content 105. The dynamic layer can incorporate effects such as alpha masks, blurs, audio equalization, still frames, clip transitions, and so forth to introduce a cinematic aspect to the recap sequence, similar to the techniques used for movie trailers. The render input instructions may include a diverse range of input fields, such as names of friends, references to current events, location-based information and so forth. Such render input instructions can be used to compose recap clip sequences with personalized overlays such as "Catch up with Jeff," "Football season is back," or "Download it to go on your United flight."

Figure 3:
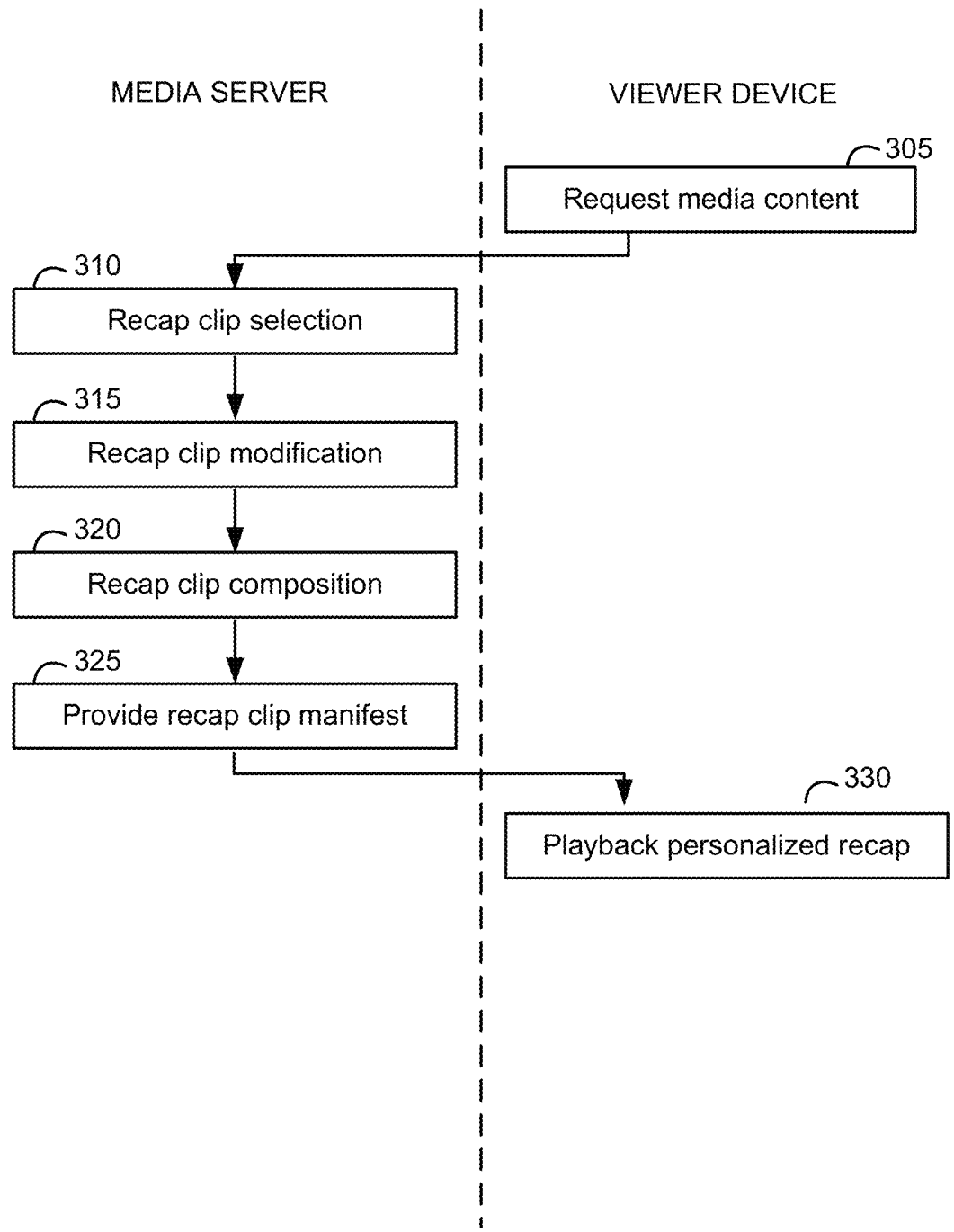
FIG. 3 is a flowchart illustrating providing personalized recap clip sequences.

A specific implementation will now be described with reference to the computing environment of FIG. 2 and the flow diagram of FIG. 3. In the depicted implementation, a viewer selects media content for playback on a device (e.g., one of devices 205a-e), for example, by selecting an episode of a television show for playback from a video streaming service, and therefore, request the particular episode from media server 210 (305).

In some implementations, personalized recap clip sequences, with or without personalized overlays, may be preemptively provided to a device independent of a request for media content corresponding to the recap clip sequence. For example, when a device is using a media content navigation page, the personalized recap clip sequence, such as a dramatic escape from an exploding vehicle, can be automatically played in slow motion in a portion of the page. As another example, the personalized recap clip sequence can be automatically played after an application starts up. Alternatively, when an audio device such as an Amazon Echo is streaming music, before a new song is started, an audio track corresponding to a personalized recap clip sequence can be played back. For devices primarily displaying still images, such as, for example, an Amazon Kindle, display screens, such as a Sponsored Screensaver for Kindle with Special Offers, still frames selected from a personalized recap sequence can be displayed in a grid or comic art panel style layout. Techniques for selecting still frames from a recap clip include image processing for motion detection, natural language processing of dialogue, and/or selecting a keyframe for an encoded group of pictures.

In certain implementations, a determination of which media content to preemptively provide a recap sequence for may be based on current events, shopping history, or social network activity, and so forth. For example, a viewer device associated with a shopping history relating to baking may be preemptively provided with a recap sequence for an abandoned reality TV style baking competition.

Media server 210 receives the request, retrieves the appropriate data from media content storage 225, including corresponding playback history, and selects a subset of the recap clips in recap clip information 235 (310) based on playback history, viewer preferences, and device attributes. For example, selection of recap clips corresponding to skipped episodes or episodes watched a long time ago are prioritized over episodes recently watched. Higher priority recap clips are selected over lower priority recap clips when the total number or the total duration of recap clips is limited. Similarly, recap clips that are tagged with content identifiers, such as category, sentiment, or actor information, that are correlated with preferences indicated in a user profile and/or playback history of other media content, are prioritized for selection.

It should be appreciated that while reference to episode in the examples described herein can be in the context of television shows organized into seasons having multiple episodes, the term episode is not limited to such contexts. For example, the personalized recap clip sequences as described herein may be generated for any individual media content or any groups of media content that can be organized in a manner corresponding to episodes. The present disclosure contemplates that a variety of organizations of media content can correspond to episodes of media content, including but not limited to temporal organizations (e.g., each game in a football season, each quarter of a football game, 41-48 minutes of content associated with a one hour show slot, etc.), thematic/narrative organization (e.g., a specific topic within a 90 minute college lecture, each Star Wars movie, etc.), event-based organization (e.g., each play in a football game, each round in a Twitch broadcast of a gaming competition), user profile-based organization (e.g., a user indicates interest in all plays involving a quarterback being sacked) and so forth.

As one example, a personalized recap clip sequence can be generated to provide a summary of recorded lectures to help a student who has been absent on medical leave quickly get up to speed. For instance, each lecture throughout a semester long course on the topic of semiconductor manufacturing can correspond to an episode of media content having one or more recap clips. Alternatively, for example, a single lecture may correspond to three episodes, the first episode relating to the portion of the lecture discussing dry etching, the second episode relating to wet etching, and the third episode relating to hybrid etching, each having one or more recap clips.

As another example, a personalized recap clip sequence can be generated to provide a summary of a particular football team's activity. For instance, each game in the preseason, regular season, or postseason can correspond to an episode of media content having one or more recap clips. The summary can include recap clips (e.g., in game highlights) of the games missed by a particular viewer device, and the selection of recap clips can be adjusted based on at what point in time into the football season the viewer is re-engaging. For example, when a viewer device requests a Super Bowl game, based on playback history and an indication of a particular team of interest, a personalized summary of the road to the Super Bowl for the particular team of interest can be provided. In the personalized summary, recap clips corresponding to missed games can be emphasized, and recap clips corresponding to viewed games can be deemphasized.

Therefore, it should be appreciated that recap clip sequences can be personalized for a wide variety of media content, such as, educational lectures, sporting events, a series of movies, spinoffs of television shows, a franchise (e.g., NCIS, etc.), a catalog of media content from a media content provider and/or producer (e.g., HBO, etc.), and so forth. For example, media server 210 can receive an indication that a particular viewer device has not renewed a subscription for a video streaming service. To encourage the viewer device to renew the subscription, a personalized recap clip sequence can be generated from recap clips corresponding to the media content from the subscription service that was the most-watched by the viewer device prior to expiration of the subscription. Similarly, a viewer device can be encouraged to engage with an unwatched show in a franchise by generating a personalized recap clip sequence including portions of the unwatched show that are related (e.g., a similar actor, character, development of a story arc, etc.) to the previously seen episodes of the watched show in the franchise.

It should also be appreciated that while reference to playback history in the examples described herein can be in the context of information indicating watched episodes in television shows, the term playback history is not limited to such contexts. For example, the personalized recap clip sequences as described herein may be generated for live media content, which in contrast to video-on-demand content, may correspond to a real-time broadcast of a live event, or may correspond to a scheduled broadcast. Returning to the example of the Super Bowl game, each play in the game can correspond to an episode of media content, each episode having one or more recap clips. In some implementations, playback history can indicate which portions of the Super Bowl game have been watched by a viewer device requesting the media content. For example, for a viewer device requesting a live stream of the Super Bowl game in the third quarter, playback history may indicate that the viewer device already watched the first quarter, but missed the second quarter. In such a scenario, a personalized recap clip sequence that emphasizes the second quarter may be generated. In certain implementations, playback history can correspond to a timestamp indicating a time that a viewer device requests a live stream of the Super Bowl. For example, if the timestamp of the request corresponds to the third quarter, and there is no additional information indicating whether prior portions of the media content were already viewed by the viewer device, a personalized recap clip sequence that summarizes both the first quarter and the second quarter may be generated. In such scenarios, a timestamp of a request for media content functions as playback history indicating that no portions of the media content have been watched. Therefore, it should be appreciated that the playback history used to personalize recap clip sequences can include, or be limited to, attributes or information relating to the request for media content (e.g., a timestamp). It should further be appreciated that the playback history used to personalize recap clip sequences for particular media content can include playback history for different media content. For example, for a viewer device requesting a live stream of the Super Bowl game in the third quarter, playback history may indicate that the viewer device watched several regular season games featuring one of the teams competing in the Super Bowl, but only watched one regular season game featuring the other team. In such an instance, the personalized recap clip sequence for the request for the live stream of the Super Bowl game in the third quarter can prioritize recap clips emphasizing the frequently watched team over the less frequently watched team.

Figure 4:
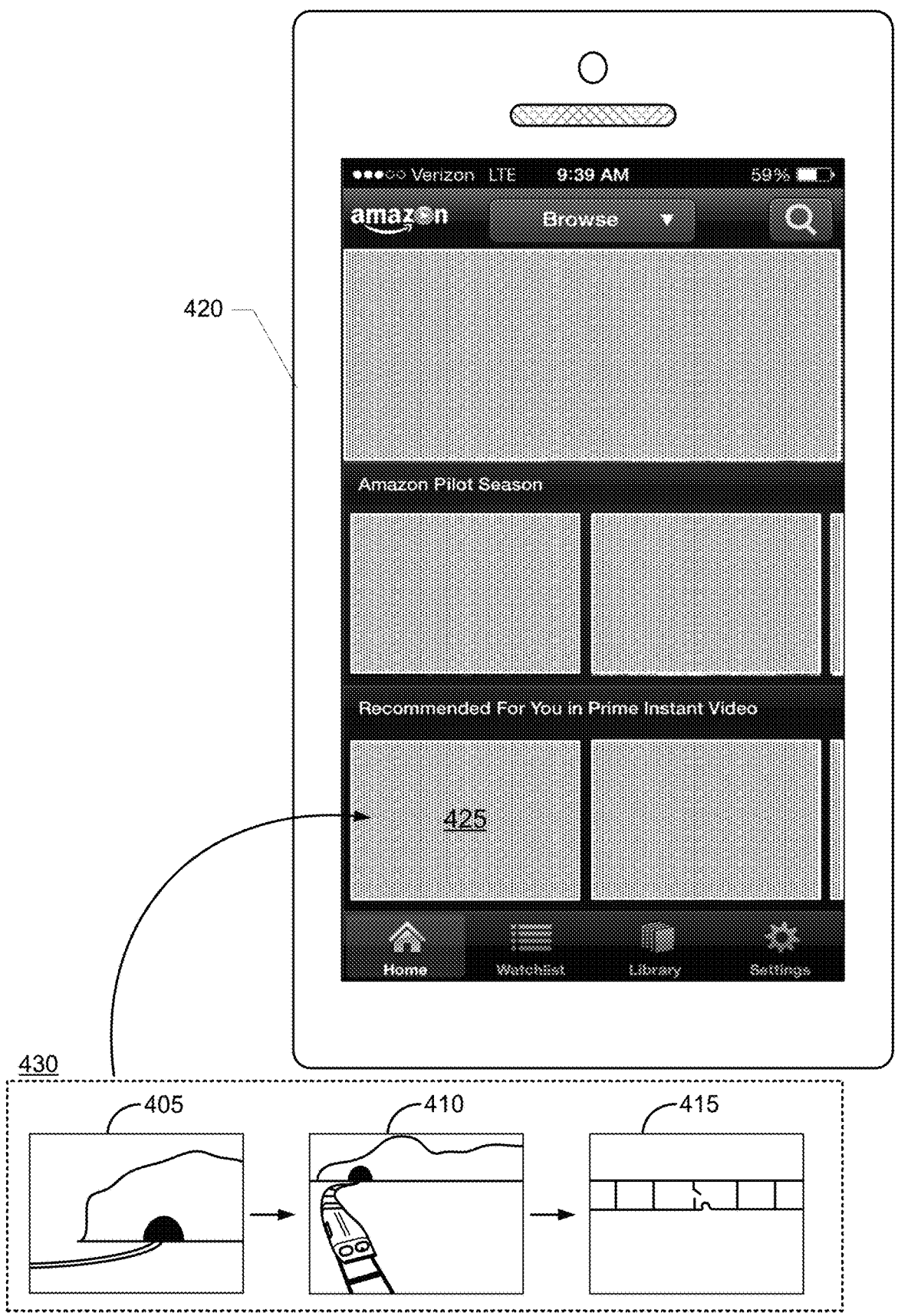
FIG. 4 illustrates an example of a media content navigation interface configured to display a personalized recap clip sequence.

In some implementations, recap clip selection is further based on device attributes, which include network conditions, hardware capabilities of the device and any connected audio/visual rendering devices, and the context for display of the recap clips. For example, FIG. 4 depicts a recap clip sequence 430 that is automatically played in a viewport 425 on viewer device 420 that is using an interface for navigating a media content catalog. In some implementations, recap clip sequence 430 has no corresponding audio sequence. Recap clip sequence 430 may only be three recap clips corresponding to recap clip 405, 410, and 415 that correspond to, for example, 15 seconds in contrast to a 90 second recap sequence that is provided at the start of playback of an episode of media content. In addition to recap clip selection accounting for the time duration of recap clip sequence playback, the size of the viewport relative to the display size of the viewer device can also be used. For viewport 425, which corresponds to only a portion of the display screen for viewer device 420, recap clips that have less visual detail may be prioritized. In contrast, when a recap sequence is being provided for playback using the entire display screen for viewer device 420, such as prior to an episode of media content, recap clips with less visual detail may not need to be prioritized for selection. Similarly, when a recap sequence is being generated for a device that only plays back audio, recap clips with dialogue may be prioritized.

Following recap clip selection, the selected recap clips can be modified (315). For example, to allow summarizing more episodes in the 15 second display in viewport 425 of the media content catalog interface, the three recap clips corresponding to recap clip 405, 410, and 415 may be shortened relative to their original duration. The modified start and stop time codes may be derived based on techniques including image processing to determine transitions (e.g., a change in camera perspective, etc.), and/or text analysis of the dialogue (e.g., detecting an end of a sentence).

It should be appreciated that modification of a recap clip is not limited to shortening, but can also involve expanding a recap clip by including image frames from portions of the media content before and after the recap clip. For example, a recap clip corresponding to a particular scene may be expanded to include more of the corresponding scene when recap clip selection logic determines that the scene was watched over a year ago, or corresponds to a critical part of a plot arc to emphasize. In some implementations, recap clip analytics logic 255 can determine based on statistical analysis of eventual playback history corresponding to different portions of a scene to use as the modified recap clip, and/or through web scraping to detect user feedback, that a modification to expand the recap clip results in improved reengagement with the media content 105.

Referring to FIG. 1, episode content 115a-d has scenes identified by scene metadata. For example, scenes A-G within episodes 105a-d are illustrated by the time intervals of episode content 115a-d represented by rectangles with bold borders. Each scene in scenes A-G has a corresponding recap clip in recap clips A-G. For example, the rectangle 175 with bold borders that contains the label A represents scene A, and the dotted portion 170 of scene A corresponds to the recap clip A. In some implementations, a scene can be represented with metadata using types of information similar to a recap clip. In FIG. 1, scene G has an episode identifier corresponding to episode 105d, a starting timecode 175a, and an ending timecode 175b. It should be appreciated that metadata describing scenes can also include metadata describing recap clip(s) associated with the scene. For example, multiple recap clips can be cross associated in the metadata describing a scene. Scene metadata may be generated using the manual or automated techniques similar to generating metadata for recap clips as described herein.

For clarity purposes, FIG. 1 illustrates recap clips having an associated scene delimited by metadata. However, it should be appreciated that an episode may have associated recap clips that correspond directly to portions of the episode, independent of the presence of scenes identified by metadata. In certain implementations having metadata describing scenes, recap clips can be represented using metadata having a scene identifier, and starting and ending timecodes relative to the identified scene.

A recap clip for a particular scene may correspond to any portion of the scene, or may correspond to the entire scene. For example, a recap clip can correspond to the entirety of an important scene, such as a character's death. Alternatively, a recap clip can correspond to a later portion of a scene depicting the resolution of the scene. As another alternative, a recap clip can correspond to an early portion of a scene depicting the setup of a conflict that is unresolved in the scene. As yet another alternative, a recap clip can correspond to an intermediate portion of a scene depicting the climax of the scene.

In FIG. 1, for clarity purposes, each scene is depicted as having one corresponding recap clip. However, in some implementations, a particular scene may have more than one corresponding recap clip. For example, scene A may have a corresponding first recap clip A1, and a corresponding second recap clip A2 (A1, A2 not shown in FIG. 1). It should be appreciated that when a scene has multiple recap clips, the recap clips may or may not be contiguous. For example, the entirety of scene A may be important, and recap clip A1 corresponds to a first half of scene A emphasizing a first character, and recap clip A2 corresponds to a second half of scene A emphasizing a second character. Alternatively, part of scene A may be unimportant, and recap clip A1 corresponds to the first third, and recap clip A2 corresponds to the last third of scene A.

It should be appreciated that as described herein, reference to portions of episodes 105a-d, such as scenes, correspond to portions of episode content 115a-d, in contrast to, for example, advertisements associated with a particular episode.

In certain implementations, modifying recap clips to have a longer duration than their original duration involves determining the scene that the recap clip corresponds to, and selecting an additional portion of the scene to include in the modified recap clip. For example, metadata describing recap clips can include metadata describing the scene corresponding to the recap clip. The start time and stop time of the corresponding scene can be used as limits to how a recap clip can be expanded. In some implementations, the modified recap clip can include portions of the scene that are not contiguous with the original recap clip.

In some implementations where scene metadata corresponding to a recap clip is unavailable, determining a portion of media content 105 corresponds to a recap clip can be implemented using video frame fingerprints. For example, in FIG. 2, media server 210 includes frame information 220. Frame information 220 can be a storage mechanism, such as a database, storing "fingerprints" of frames (i.e., still images in video) or sequences of frames of television shows. For example, frames of every episode of a television show (e.g., one or more frames from each scene in each episode of the television show) stored in media content storage 225 can be "fingerprinted" to determine a visual signature (e.g., by generating a unique hash-code based on image data of the frame) to be able to determine that a recap clip from a recap clip sequence (e.g., recap clip C in recap clip sequence 111*c* in FIG. 1) corresponds to a scene in the episode content (e.g., scene 155 in episode 105*a* in FIG. 1). In some implementations, the fingerprint can be an audio signature based on the audio content being played with the frame. Since recap clip C includes frames from scene 155 (since it is a shortened version of scene 155), the visual signature or fingerprint of a frame in recap clip C can be the same or substantially similar (e.g., within a certain threshold) to a frame in scene 155, as well as unique compared to other frames. As a result, a fingerprint of a frame of recap clip C can be used to search the database of fingerprints of the frames of all of the episodes of the television show for the same (or substantially similar) fingerprint and determine the scene and/or episode it is from. In some implementations, multiple fingerprints of multiple frames can be combined to create hash-codes as well. Examples of fingerprinting frames are explained in more detail in U.S. patent application Ser. No. 14/498,818, titled VIDEO CONTENT ALIGNMENT, by Yalniz et al., filed on Sep. 26, 2014, and is hereby incorporated by reference in its entirety and for all purposes.

Frame information 220 also can store data indicating the frames and/or their fingerprints that are grouped together to define a scene. Each episode of a television show may be a sequence of scenes. Each frame (as indicated by its fingerprint or visual signature) can be grouped with other frames to define scenes. As a result, any frame within a recap clip in a recap clip sequence can be correlated with a specific scene of the episode content of an episode of a television show since the frame would also appear in the scene.

In addition to selection, modification, and reordering, the recap clip sequence may also undergo a composition process to include additional media content or media content effects (320). For example, a particular television show may have been awarded an Emmy award. Concurrent with the awards show, recap clip sequences can be dynamically generated to incorporate media content relating to current events, such as video clips of cast members receiving the award, and overlaid with text such as "Winner of the Best Drama," to create recap clip sequences to preemptively distribute in an attempt to reengage viewers who abandoned the show midseason.

Media server 210 provides information for requesting the selected recap clips to the viewer device (325). In some implementations, the information may be in the form of recap manifest data 135, which may specify a template for formatting requests for media content fragments corresponding to a URL using the HTTP protocol. The recap manifest data 135 for requesting fragments corresponding to a recap clip sequence may be embedded within manifest data for requesting fragments of episode content, or may be provided separately, such as, for example, a separate manifest file.

In some implementations, the fragments corresponding to a recap sequence are dynamically generated. For example, the recap manifest data 135 can specify a series of byte ranges or time codes corresponding to media content 105 stored at the media server 110 and/or in a content delivery network. For each request from viewer device 120 for a fragment of a recap sequence, media server 110 or the content delivery network can provide the corresponding byte range or time range extracted from media content 105.

In certain implementations, the recap sequence is pre-generated and stored at media server 110 and/or a content delivery network separate from media content 105. For example, media server 110 can pre-generate a recap sequence based on a time threshold. For instance, after three months has elapsed since episode 105*c* was played by viewer device 120, media server 110 can generate a recap sequence in anticipation of viewer device 120 or other similarly situated devices requesting an unplayed episode. When viewer device 120 transmits request 185 for an episode of media content 105, media server 110 can provide recap manifest data 135 specifying an index number for the first fragment of the recap sequence previously generated. Viewer device 120 can subsequently issue requests for all fragments of the recap sequence by incrementing the index number until an end of file indication is provided by media server 110, representing the end of the recap sequence.

The received fragments for the recap clip sequence are played back at the viewer device (330).

The techniques described herein relate to personalizing a sequence of recap clips based on factors including, for example, playback history, viewer preferences, device attributes, and the characteristics of a requested episode. The use of viewer specific and device specific information when providing a sequence of recap clips facilitates a greater likelihood of acquiring new viewers for a show, re-engaging viewers who have abandoned a show, and retaining viewers engaged with a show. Examples of implementations have been described in which personalized recap clip sequences are played prior to the presentation of corresponding media content (e.g., as a "previously on" segment), or in a portion of a display for media content selection (e.g., a content service interface). However, it should be understood that the presentation of personalized recap clip sequences generated as described herein is not limited to such examples. For example, such a recap sequence could be presented at any time during or after the presentation of the corresponding media content, related media content, or even unrelated media content. Moreover, such a recap sequence need not only be presented in the context of a content service. Rather, it could be presented as an advertisement in any context in which online advertisements appear, e.g., in a web page, in an app interface, etc.

More generally, while the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
identifying a first playback history associated with a first client device, the first playback history indicating previously played episodes of first media content;
identifying a second playback history that is distinct from the first playback history, the second playback history indicating previously played episodes of the first media content;
identifying a plurality of recap clips associated with the first media content, each recap clip including a portion of a corresponding episode of the first media content;
selecting a subset of the recap clips based on the first playback history and the second playback history; and
providing the subset of the recap clips to the first client device.

2. The computer implemented method of claim 1, wherein the subset of recap clips includes a recap clip corresponding to an episode that is not a previously played episode of the first playback history.

3. The computer implemented method of claim 2, wherein the recap clip corresponding to an episode that is not a previously played episode of the first playback history is a previously played episode of the second playback history.

4. The computer implemented method of claim 1, wherein selecting the subset of the recap clips is further based on a relationship of one or more of the recap clips to an episode that is not a previously played episode of the first playback history or the second playback history.

5. The computer implemented method of claim 1, wherein selecting the subset of the recap clips is further based on a relationship of one or more of the recap clips to a most recently played episode of the first media content represented in the second playback history.

6. The computer implemented method of claim 1, wherein the second playback history is associated with a first user profile that is different from a second user profile associated with the first playback history.

7. The computer implemented method of claim 1, wherein the second playback history is associated with a second client device.

8. The computer implemented method of claim 1, wherein providing the subset of the recap clips to the first client device is in response to use of a content interface on the first client device.

9. The computer implemented method of claim 1, wherein selecting the subset of the recap clips is further based on a most recently played episode of the first media content represented in the first playback history.

10. The computer implemented method of claim 9, wherein selecting the subset of the recap clips is further based on when the most recently played episode of the first media content was played as represented in the first playback history.

11. A system, comprising one or more computing devices configured to:
identify a first playback history associated with a first client device, the first playback history indicating previously played episodes of first media content;
identify a second playback history that is distinct from the first playback history, the second playback history indicating previously played episodes of the first media content;
identify a plurality of recap clips associated with the first media content, each recap clip including a portion of a corresponding episode of the first media content;
select a subset of the recap clips based on the first playback history and the second playback history; and
provide the subset of the recap clips to the first client device.

12. The system of claim 11, wherein the subset of recap clips includes a recap clip corresponding to an episode that is not a previously played episode of the first playback history.

13. The system of claim 12, wherein the recap clip corresponding to an episode that is not a previously played episode of the first playback history is a previously played episode of the second playback history.

14. The system of claim 11, wherein selecting the subset of the recap clips is further based on a relationship of one or more of the recap clips to an episode that is not a previously played episode of the first playback history or the second playback history.

15. The system of claim 11, wherein selecting the subset of the recap clips is further based on a relationship of one or more of the recap clips to a most recently played episode of the first media content represented in the second playback history.

16. The system of claim 11, wherein the second playback history is associated with a first user profile that is different from a second user profile associated with the first playback history.

17. The system of claim 11, wherein the second playback history is associated with a second client device.

18. The system of claim 11, wherein providing the subset of the recap clips to the first client device is in response to use of a content interface on the first client device.

19. The system of claim 11, wherein selecting the subset of the recap clips is further based on a most recently played episode of the first media content represented in the first playback history.

20. The system of claim 19, wherein selecting the subset of the recap clips is further based on when the most recently played episode of the first media content was played as represented in the first playback history.

* * * * *